May 7, 1940.　　　　C. CAMPBELL　　　　2,199,537
MULTIPLYING MACHINE
Filed May 6, 1936　　　　6 Sheets-Sheet 1

FIG. 1.

INVENTOR
Charles Campbell
BY
ATTORNEY

May 7, 1940.  C. CAMPBELL  2,199,537

MULTIPLYING MACHINE

Filed May 6, 1936   6 Sheets—Sheet 2

FIG. 2.

|  MULTIPLIER | ACC. | |
| DIGIT | L.P. | R.P. |
|---|---|---|
| 1 | MC | |
| 2 | 2MC | |
| 3 | -2MC | 5MC |
| 4 | -MC | 5MC |
| 5 |  | 5MC |
| 6 | MC | 5MC |
| 7 | 2MC | 5MC |
| 8 | -2MC | 10MC |
| 9 | -MC | 10MC |

FIG. 5.

M'CAND   MULTIPLIER   PRODUCT
673 × 814 = 547822
       MC   2×MC   5×MC
      673   1346   3365
                              L.P.            R.P.
CYCLE A (673×4)    ( ) (-MC) 999326 (+5MC) 3365
                                                    1
CYCLE B (673×1)    → (MC)   6730
CYCLE C (673×8)    ( ) (-2MC) 865399 (10MC) 673000
                                                    1
                           871457    676365
                 TRANSFER  676365 ←
                           547822

FIG. 6

INVENTOR
Charles Campbell
BY
*W. M. Wilson*
ATTORNEY

Patented May 7, 1940

2,199,537

UNITED STATES PATENT OFFICE 2,199,537

MULTIPLYING MACHINE

Charles Campbell, London, England, assignor to International Business Machines Corporation, New York, N. Y., a corporation of New York Application May 6, 1936, Serial No. 78,123
In Great Britain May 23, 1935

6 Claims. (Cl. 235—61.8)

This invention relates to multiplying machines and more specifically to a machine which multiplies by first forming a series of multiples of the multiplicand and then selecting the multiples appropriate to the digits of the multiplier and summing the selected multiples in an accumulator or accumulators.

In the prior art there are machines in which the series of multiples comprises once, twice, four times and five times the multiplicand and in which two product accumulators are employed. Such machine multiplies by each digit of the multiplier in turn. In order to multiply by one, two, four or five, the machine selects the corresponding multiple and enters it into one of the product accumulators. In order to multiply by any other digit, the machine selects the pair of multiples whose sum is equal to the product of the multiplicand and the multiplier digit and enters the selected multiples, one into one product accumulator, and the other concurrently into the other product accumulator. After multiplication has been effected by all the multiplier digits, the total in one accumulator is entered into the other accumulator to give the final product.

In this prior machine the multiple-forming mechanism comprises three accumulators of which one is provided with doubling reading-out mechanism by which double the amount contained in the accumulator can be read out and entered into one of the product accumulators. The multiplicand is entered into this accumulator and also into one of the other accumulators. Then twice the multiplicand is read out by means of the doubling reading-out mechanism of the first accumulator and entered into the other two accumulators in each of two successive cycles. Thus once and twice the multiplicand is obtained in the first accumulator and four and five times the multiplicand are obtained in the other two accumulators respectively.

According to the present invention a multiplying machine for multiplying a multiplicand by a multiplier comprises multiple-forming mechanism arranged automatically to calculate and register a series of multiples of the multiplicand, a product accumulator, means for entering any of the multiples into the accumulator additively and certain of them into the accumulator subtractively, and multiple-selecting means automatically operable to select, in accordance with each digit of the multiplier in operation, a multiple which, or a pair of multiples whose sum or difference, is equal to the product of the multiplicand and the multiplier digit, and arranged to cause the multiples that are selected as a negative term of the difference to be entered subtractively into the accumulator and the remainder to be entered additively.

It will be seen that the present invention differs from the prior machine referred to above in that the final product is obtained by the addition and subtraction of selected multiples instead of being formed entirely by the addition of selected multiples. The provision for subtraction of the multiples renders it possible to use either a fewer number of multiples or a series of multiples that can be obtained more simply and with a minimum of mechanism.

In one arrangement in accordance with the invention the series of multiples is once, twice, five-times and ten-times the multiplicand. This series can be obtained from a single entry of the multiplicand in an entry receiving device without the use of adding mechanism.

It is preferred to employ two product accumulators and to arrange the multiple-selecting means to enter a pair of multiples, when selected in accordance with one multiplier digit, concurrently one into one accumulator and the other into the other accumulator. The use of two accumulators increases the speed of the machine, particularly when multiplying by a large number.

A multiplying machine in accordance with the present invention will now be described, by way of example only, with reference to the accompanying drawings, in which.

Like reference characters indicate like parts throughout all the figures of the drawings.

The machine which will now be described is of the kind known commercially as the "Hollerith" multiplying punch. A machine of this kind is described in British Patent Specification No. 405,031, and in U. S. Patent 2,097,145, granted October 26, 1937. The present machine is similar, as regards the arrangement of the parts, to that described in this prior machine and differs principally in the manner in which multiplication is effected. It will be sufficient therefore if the general arrangement of the machine is described briefly.

GENERAL ARRANGEMENT OF THE MACHINE

Figure 1:
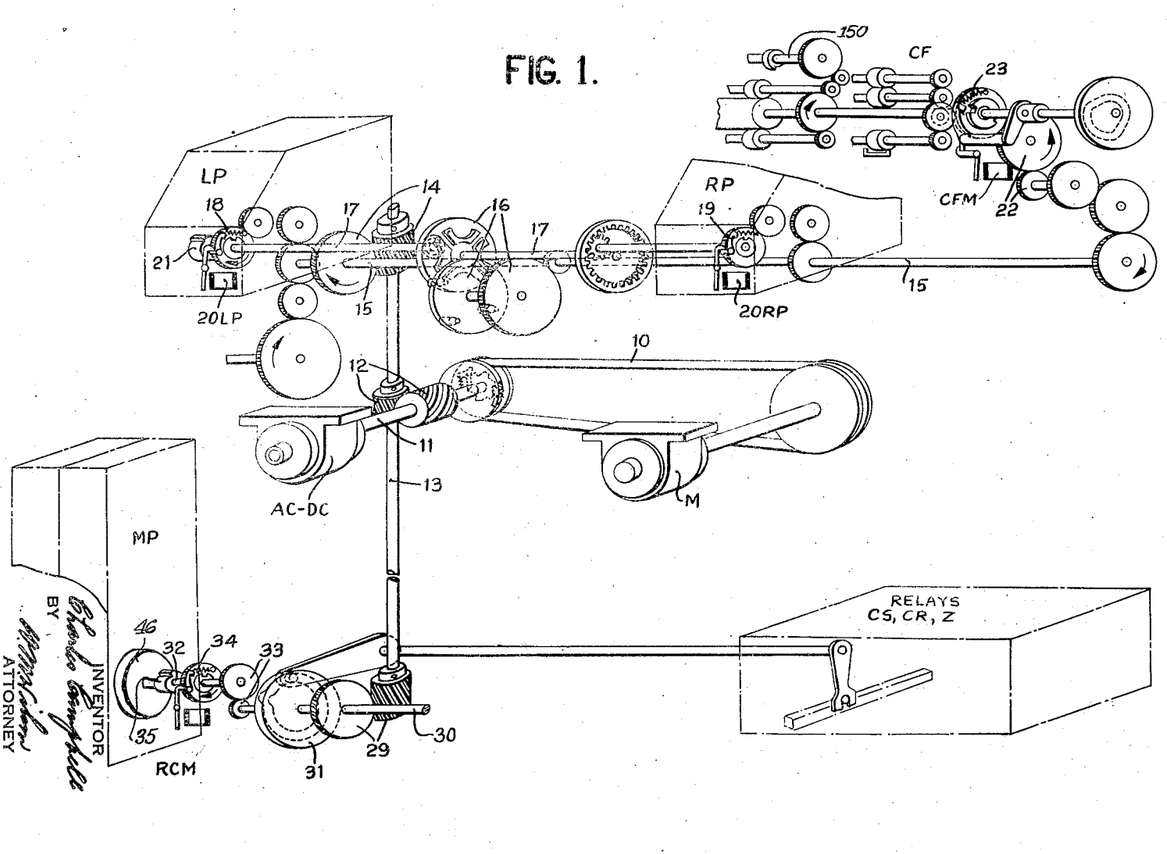
Fig. 1 shows diagrammatically the general arrangement of the multiplying machine.

Referring to Fig. 1, the machine is driven by a motor M which through a belt 10 drives a shaft 11. The shaft 11 drives a dynamo AC—DC which provides A. C. current and D. C. current to the circuits in the machine. The shaft 11 through worm gearing 12 drives a vertical shaft 13, which through worm-gearing 14 drives a shaft 15. The shaft 15 drives two accumulators LP and RP which are conventional accumulators of the type used in Hollerith tabulating machines. The shaft 15 through Geneva-gearing 16 drives a reset shaft 17. The accumulator LP can be coupled to this shaft by engaging a clutch 18 so that it is reset to zero. The accumulator RP can be reset by engaging a clutch 19. These clutches can be engaged by energizing magnets 20LP and 20RP respectively, top Figures 3 and 3a. The clutch 18 also couples a cam 21 to the shaft 17. This cam operates contacts LP—1 (Figure 3), LP—2 and LP—3 (Figure 3b), so that these contacts are operated only while the accumulator LP is being reset.

The shaft 15 drives card-feeding mechanism CF through 2:1 gearing 22 and a one revolution clutch 23. The clutch 23 is engaged by energizing a card-feed-clutch magnet CFM (top, Figure 3b). The gearing is such that a complete cycle of the card feed mechanism corresponds to two revolutions of the shaft 15 and two cycles of the accumulators.

Figure 3:
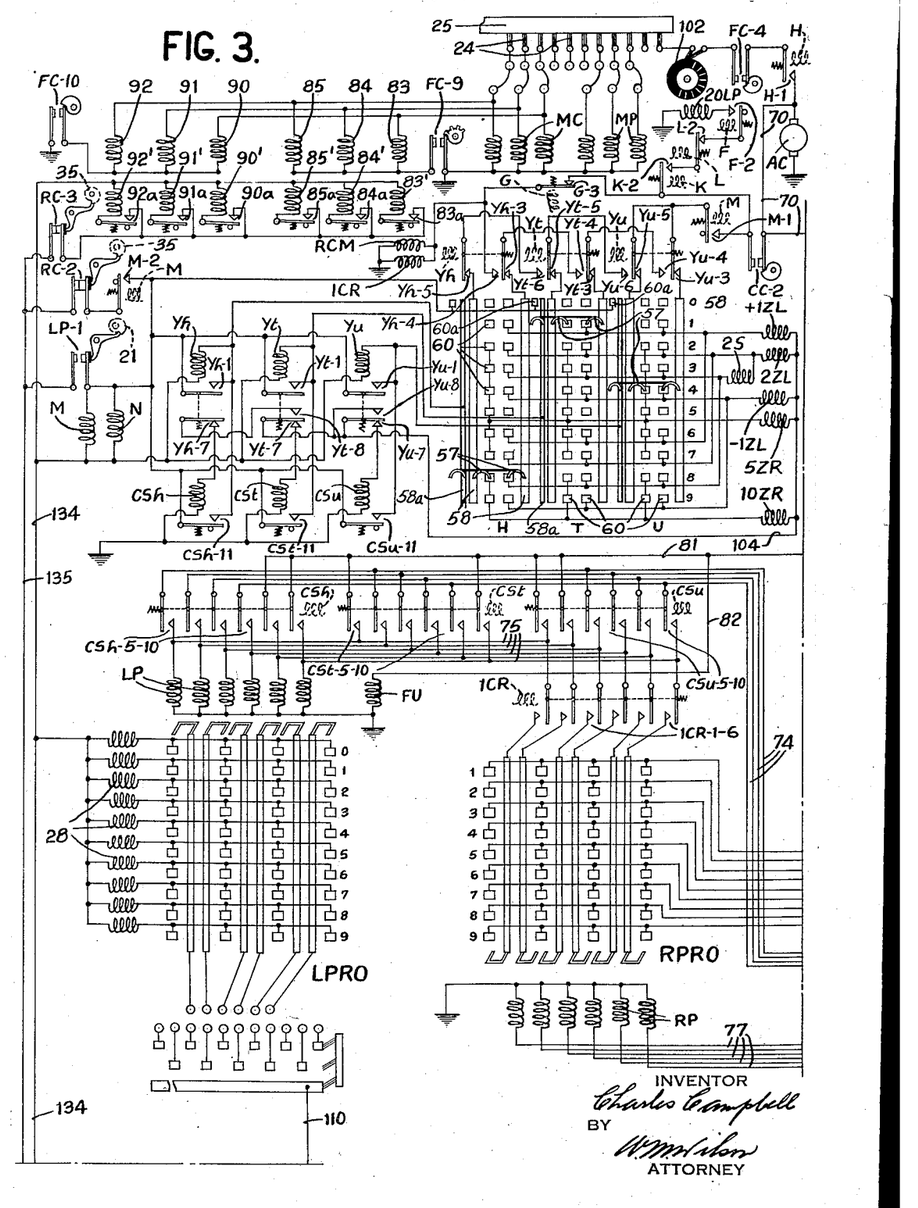
Figs. 3, 3a and 3b taken together form a circuit diagram for the machine with Fig. 3a to the right and Fig. 3b below Fig. 3.

The card feeding mechanism withdraws the cards one by one from the magazine and feeds each card to a position in which it is about to pass between brushes 24 (Figure 3) and a contact roller 25. The card remains in this position until the next card feeding cycle when it is fed to pass the brushes and delivered to the punching mechanism. While this is taking place the next card is being fed into the position in which it is about to pass the brushes. When a card is in the latter position, it closes card lever contacts 26 (lower, Figure 3b). When a card is delivered to the punch it closes card lever contacts 27 (lower, Figure 3b). The punch is of the kind comprising a single row of punches which can be individually selected for operation by punch magnets 28 (Figure 3). Each card delivered to the punch is fed, as soon as the preceding card is ejected, to a position in which the punches are over the first column of a field which is to receive the product. The card feeding mechanism and the punching mechanism is identical with that described in British Specification No. 405,031 aforesaid, and will not therefore be described in detail. The card feeding mechanism includes a shaft 150 (corresponding to shaft 93 of British Patent No. 405,031) which carries the contact operating cams for operating the contacts prefixed FC in the circuit diagram. On shaft 15 or a shaft geared thereto (such as shaft 391 of British Patent No. 405,031) are contact operating cams for operating the contacts prefixed CC in the circuit diagram.

The shaft 13, through worm-gearing 29, drives a shaft 30 (Figure 1). This shaft carries a cam 31 for mechanically resetting certain relays CS, CR and Z. These relays are similar in construction to relays X1 to X9 described in Specification No. 405,031. That is, they are electrically tripped and mechanically restored relays. The shaft 30 also drives a shaft 32 through 2:1 gearing 33 and a one revolution clutch 34. The shaft 32 operates multiplier and multiplicand receiving devices MP and MC. The clutch 34 is engaged on the energization of a register clutch magnet RCM (top, Figure 3). The shaft 32 also carries a cam 35 for operating contacts RC—1 (Figure 3b), RC—2 and RC—3, (Figure 3).

The multiplicand and multiplier receiving devices

Figures 2, 5, 6:
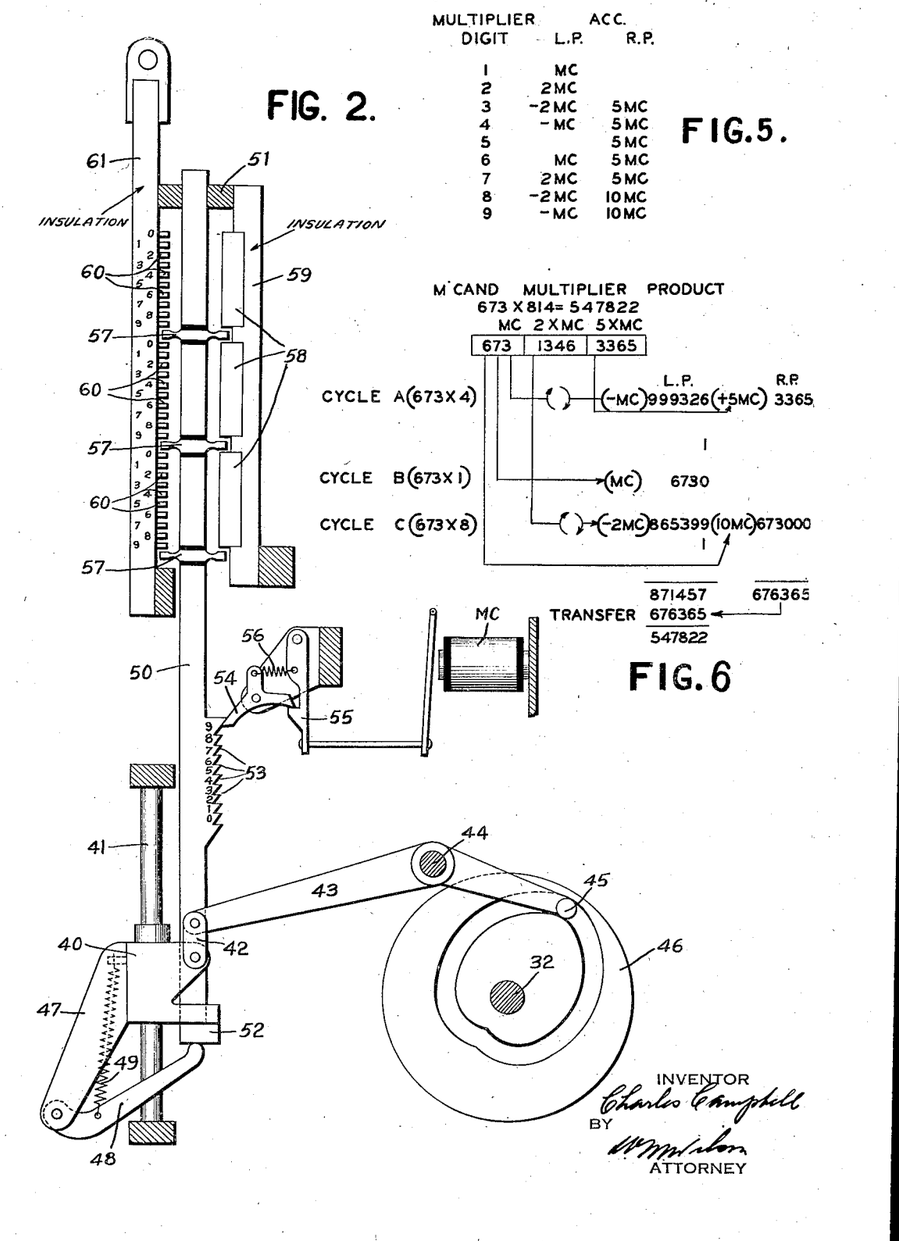
Fig. 2 shows in side elevation a multiplicand receiving device employed in the machine.
Fig. 5 is a diagram showing the order in which multiples are entered in the accumulators according to the invention.
Fig. 6 is a diagram showing the solution of a problem according to Fig. 5.

Referring to Figure 2 the multiplicand and multiplier receiving devices form a single mechanism which comprises a cross-head 40 mounted to slide vertically on rods 41 and connected at each end by a link 42 to a separate bell-crank lever 43. The levers 43 are pivoted at 44 and carry rollers 45 engaging in cam slots in the cams 46 secured on the shaft 32. As this shaft rotates, the levers 43 are oscillated and the cross-head 40 is raised and lowered. The cross-head 40 is provided with a bracket 47 to which are pivoted levers 48. The levers 48 are pulled upwardly by springs 49 and support the lower ends of slide bars 50. The slide bars are guided at their lower ends in the cross-head and at their upper ends in a frame member 51. Normally, each slide bar is held up by its spring 49 so that a toe 52 on it bears on the bottom of the cross-head. As the cross-head 40 rises, the slides 50 will rise with it but each slide can be arrested individually, the springs 49 permitting the cross-head to rise independently of the slides.

The slides are divided into two groups, one group constituting the multiplicand receiving device and controlled by magnets MC (Figure 2, and top Figure 3) and the other group constituting a multiplier receiving device and being controlled by magnets MP (top, Figure 3). As each slide bar rises with the cross-head, teeth 53 on it successively pass a stop pawl 54 which is normally latched by a latch 55. When the corresponding magnet MC or MP is energized, it actuates the latch 55 to release the pawl which is moved by its spring 56 to engage one of the teeth 53 and thus arrest the slide 50. The position in which the slide 50 is arrested depends on the time in the cycle which the magnet MC is energized. The magnets MP control their slides 50 in exactly the same manner.

It should be mentioned that Figure 2 shows the position assumed when the clutch 34 (Figure 1) has completed half a revolution from its normal disengaged position. In this position the clutch is still engaged, and this is the position assumed by the parts before the machine is started in operation. The clutch 34 is of the conventional kind which when once engaged by the magnet RCM remains engaged until it has turned through the revolution when it is mechanically disengaged. When the clutch is disengaged, the cross-head 40 is at the top of its stroke and the slides 50 are in the positions in which they were arrested during the upstroke of the cross-head. Thus, the amounts entered in the receiving devices MC and MP are retained until the magnet RCM is energized to engage the clutch 34. The receiving devices are cleared during the downstroke of the cross-head which then follows, while new amounts may be entered during the following upstroke of the cross-head and these amounts will be retained until the magnet RCM is again energized.

Each multiplicand slide 50 carries six brushes 57, of which three are on one side of the bar and three on the other side and which are insulated from the bar and from one another. Each brush co-operates with a separate common bar 58, mounted in an insulating member 59, and with a set of ten segments 60 mounted in an insulating member 61. Each of the segments 60 in a set corresponds to a different digit, the highest corresponding to 0 the next lower to 1 and so on downwards, and the arrangement is such that when a slide 50 is arrested in a position to represent a digit, the brushes 57 on that slide will each engage the associated segment 60 corresponding to that digit and will each connect this segment to the related common segment 58. The multiplier slides are similar but are only provided with three brushes 57. Two of these brushes co-operate each with a set of ten segments 60 and a common segment 58, while the third one co-operates with a single segment 60 corresponding to zero, and a common segment 58. If a slide 50 rises without its movement being interrupted by the energization of a magnet MC or MP, it will come to rest in the position in which its brushes 57 engage the zero segments 60. Thus, it is not necessary to energize a magnet MC or MP in order to enter zero.

Multiples reading-out circuits

Figure 3A:
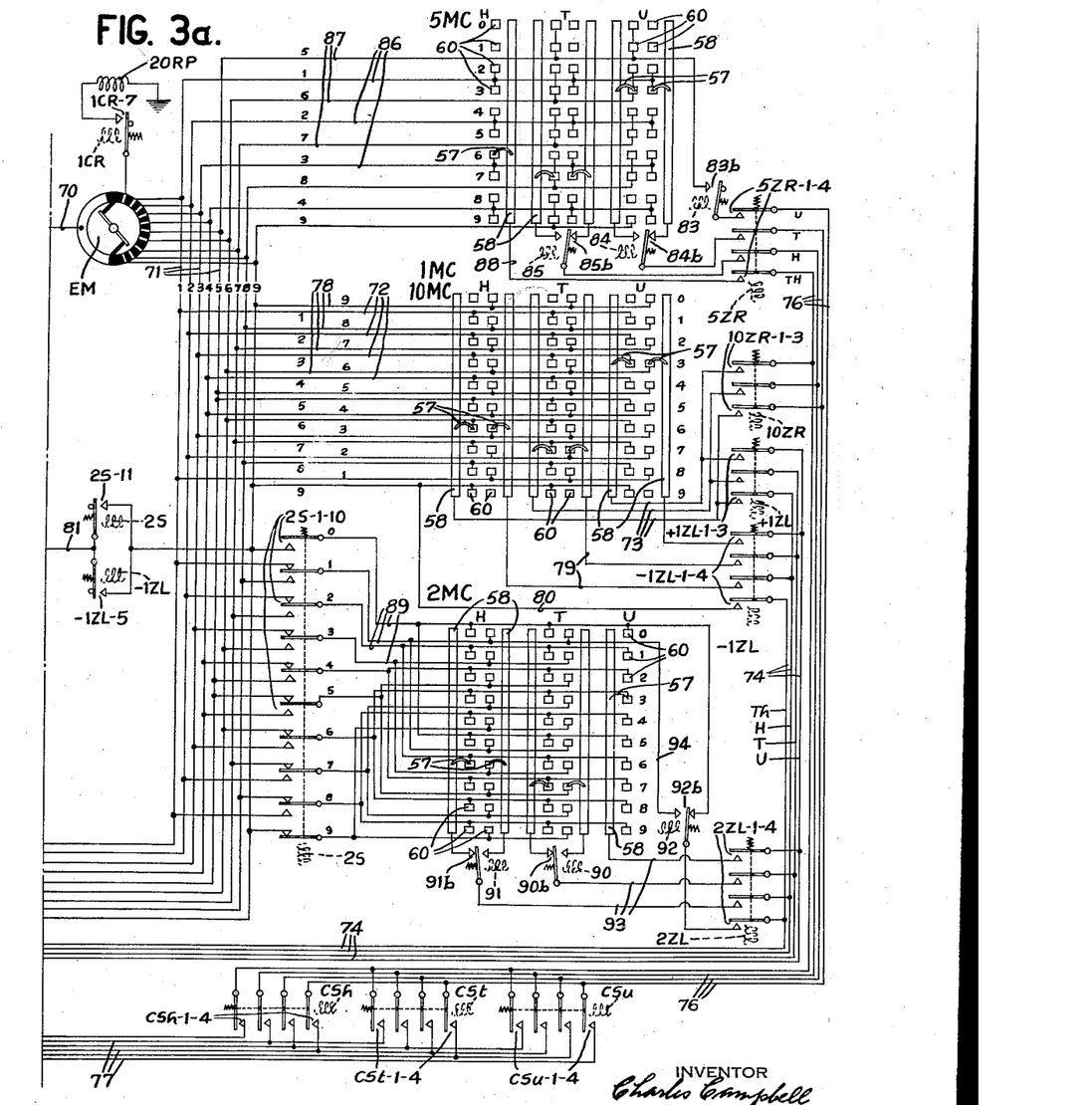
Figure 3B:
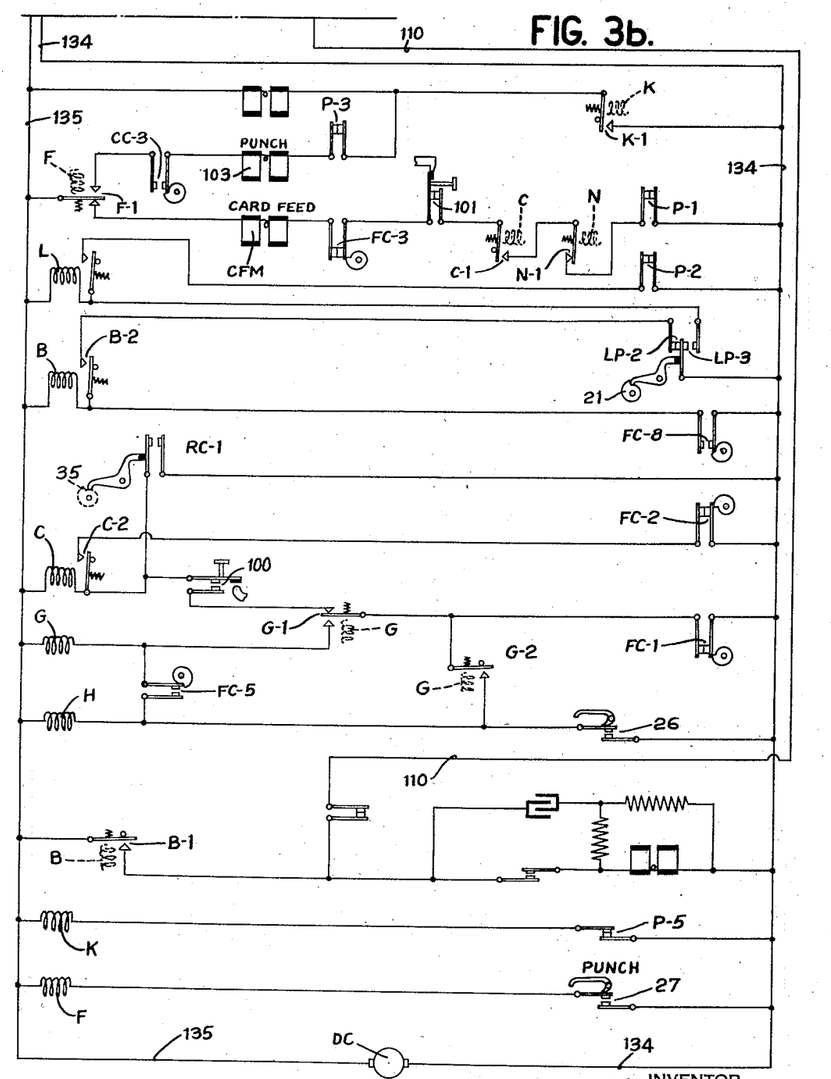

In Figures 3, 3a, and 3b the circuits necessary for multiplying together two three figure numbers are shown, but it will be understood the circuits may be duplicated to allow multiplication by larger numbers. The segments 58 and 60 associated with three multiplicand slides 50 are shown in Figure 3a. The upper group of segments constitutes a reading-out mechanism for five times the multiplicand. The lowest group constitutes a reading-out mechanism for twice the multiplicand while the centre group comprises two reading-out mechanisms, one for reading-out once or ten times the multiplicand and the other for reading-out the complement of the multiplicand. The three segments 58 and sets 60 associated with and on one side of the slide bar are shown in vertical alignment in Figure 3a and each slide bar 50 is associated with a pair of segments 58 and a pair of sets of segments 60 in each section.

A commutator or impulse emitter EM is provided and is driven continuously in any convenient manner. This commutator serves to connect a line 70 (Figure 3) which is connected to the A. C. part of the generator to each of a series of lines 71 (Figure 3a) in turn. Each line is connected in circuit at a time in the cycle of the accumulators appropriate for transmitting an impulse to accumulator magnets LP and RP (lower, Figure 3) to cause the accumulators to add a particular digit. As usual in Hollerith accumulators, the time at which an accumulator magnet is energized determines the value of the digit added. Thus, each line 71 corresponds to a particular digit as indicated by the numerals shown against them in Figure 3a.

Once the multiplicand

Considering now the central section of the multiplicand reading-out mechanisms, each segment 60 in the first, third and fifth set of segments is connected by a line 72 to the line 71 having the same digital value. The corresponding common segments 58 are connected by lines 73 to relay contacts +1ZL—1—3. When these contacts are closed they connect the lines 73 to three of the four lines 74 which are connected on the closure of relay contacts CSu—5—10 (Fig. 3) to lines 75 leading to the three lowest accumulator magnets LP. The four lines 74 are associated respectively with the magnets LP in the thousands, hundreds, tens and units denominations of the accumulator as indicated by the reference characters Th, H, T and U in Figure 3a. The lines 73 are connected to the hundreds, tens and units lines 74 and the circuits extend through the three lowest accumulator magnets LP.

By means of these circuits the multiplicand can be read-out and entered into the accumulator LP. In Figure 3a the brushes 57 are shown in the positions for representing 673. The circuit for entering the highest digit 6 extends from the A. C. generator through the line 70, the emitter EM at the six time in the cycle, the line 71 corresponding to 6, the line 72 corresponding to 6, the hundreds segment 60 corresponding to 6, the hundreds brush 57 and segment 58, the lowest line 73, the lowest pair of contacts 1ZL—1—3, the hundreds line 74, the third pair of contacts CSu—5—10 (Figure 3) from the right to the hundreds accumulator magnet LP. Similar circuits are completed for entering the other digits of the multiplicand.

The lines 73 may also be connected by closing contacts 10ZR—1—3 to lines 76 which are connected by contacts CSu—1—4 (lower, Figure 3a) to lines 77 leading to the accumulator magnets RP, (Figure 3). The lines 76 also correspond respectively to the thousands, hundreds, tens and units denominations. The contacts 10ZR—1—3 connect the lines 73 to the thousands, hundreds and tens lines 76 so that the circuit for entering the hundreds multiplicand digit will extend to the thousands accumulator magnet RP, the remaining circuits also corresponding to the next higher denomination to that of the digit read-out. Thus, ten times the multiplicand will be entered over the circuits including the contacts 10ZR—1—3.

The circuits just traced are appropriate for multiplication by the units digit of the multiplier. When multiplication is effected by the tens digit, groups of relay contacts CSt—1—4 and CSt—5—10 will be closed so that the entries are made one denomination higher than when multiplying by a units digit. In the same way, when multiplying by the hundreds digit, groups of contacts CSh—1—4 and CSh—5—10 are closed and the entries are made two denominations higher than when multiplying by a units digit.

Each segment 60 in the second, fourth and sixth sets (from the left) of the middle section is connected by a line 78 to the line 71 corresponding to the complementary digit of its own digit, i. e., each "zero" segment is connected to the line 71 for 9, each "one" segment connected to the line 71 for 8, and so on. The corresponding common segments 58 are connected by lines 79 to contacts —1ZL—1—4 which connect the lines 79 to the lines 74. Thus, when these contacts close, circuits will be established for entering the complementary digits of the multiplicand into the accumulator LP. This allows of the entry of the complement of the multiplicand into the accumulator LP which, as is well known, is equivalent to subtracting the multiplicand in the accumulator LP.

The circuits over the lines 79 provide for the entry of three digits only and it is necessary to enter 9 into each other denomination of the accumulator LP, and also to add the fugitive unit. The lowermost pair of contacts —1ZL—1—4 serves to connect the thousands line 74 to a line 80 which is connected to the line 71 for "nine", thus 9 will be entered as the thousands digit of the multiplicand. Contacts —1ZL—5 (Figure 3a) will also be closed and serve to connect the line 71 for "nine" to a line 81 which is connected through contacts of the relays CSu, CSh, SCt, to the appropriate accumulator magnets LP, to provide for the entry of 9 into those denominations which do not receive entries over the lines 74. The contacts —1ZL—5 also complete a connection to a line 82 leading to a magnet FU corresponding to magnet 399 shown in Fig. 30 of British Patent No. 405,031. This magnet serves to trip the carry mechanism to the units denomination of the accumulator LP in a well known manner. It will be appreciated that whenever the relay —1ZL is energized, the magnet FU will be energized and the carry mechanism to the units denomination will operate so that the units denomination of the accumulator LP will add the fugitive unit.

Five times the multiplicand

The upper section of the multiplicand reading-out mechanism is employed to enter five times the multiplicand into the accumulator RP. The segments 60 in this section are connected together in pairs corresponding to the digits 0 and 1, 2 and 3, 4 and 5, 6 and 7, 8 and 9. The segments in the first, third and fifth sets from the left are connected each by a line 86 to the line 71 corresponding to half (to the next lower integer) of the digit of the segment. Thus, the two and three segments are connected to the "one" line, the four and five segments to the "two" line, and so on. The segments in the second and fourth section from the left are connected by lines 87 each to the line 71 corresponding to five plus half the digit of the segment. The highest (left-hand) common segment 58 is connected by a line 88, one pair of relay contacts 5ZR—1—4 to the thousands line 76 so that when the relay 5ZR is energized, a circuit may be completed at a time corresponding to half the hundreds digit of the multiplicand to enter half that digit into the thousands denomination of the accumulator RP. With relay contacts 84b and 85b in their normal position as shown, similar circuits will be completed for the tens and units denominations extending to the hundreds and tens denominations of the accumulator RP.

With the multiplicand representing 673, the circuit through the hundreds section will represent 3, which is exactly half 6. The circuit through the tens denomination will also represent 3, but there will be a remainder of 1 in this case. This remainder is taken care of in reading-out the units digit in the following manner. When the tens digit is odd, the contacts 84b are shifted, thereby connecting the left-hand units common segment 58 in circuit with the tens line 76. The associated segments 60 are connected up so that the circuit is completed at a time corresponding to five plus half the units digit. In the case assumed the units digit is 3, so that the circuit is timed to represent 5+1 or 6. When the units digit is odd, the contacts 83b will close, thereby connecting the line 87 for five to the units line 76, so that 5 is entered into the units denomination of the accumulator RP.

It will be appreciated that the upper section of the reading-out mechanism provides a reading of half the multiplicand and that the connections to the lines 76 are such that half the multiplicand is multiplied by ten during the entry into the accumulator RP. Thus, the top section provides means for entering five times the multiplicand into the accumulator RP.

Figure 4:
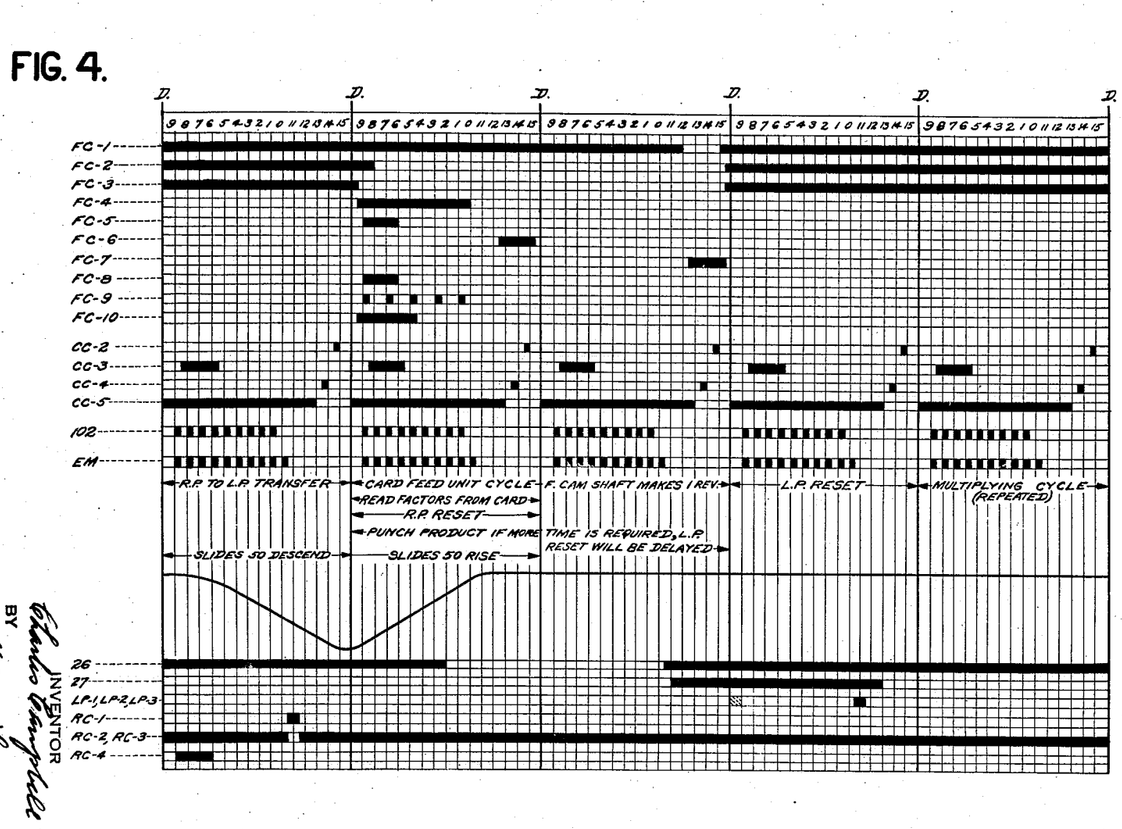
Fig. 4 is a timing diagram for the machine.

The condition of the contacts 83b, 84b and 85b is controlled in the following manner. The operating coils 83, 84 and 85 (Figure 3) of double-wound relays are connected respectively in parallel with the units, tens and hundreds magnets MC, and contacts FC—9 are connected in the circuit for each coil 83, 84 and 85. The contacts FC—9 close repeatedly (see Fig. 4) while the hole positions for the odd digits are passing the brushes 24, so that, when a brush 24 encounters a hole representing an odd digit in the multiplicand, one of the relay coils will be energized at the same time as the corresponding magnet MC. Each of these coils when energized closes contacts 83a, 84a, or 85a, to energize a holding coil 83', 84' or 85' as the case may be. A circuit is then established from the DC output of the dynamo (lower, Figure 3b) through a line 134 (Figure 3), the holding coil in question, the associated contacts, contacts RC—3 and a line 135. The holding coil maintains the associated contacts closed and also shifts the associated contacts 83b, 84b or 85b. The contacts RC—3 open momentarily while the cross-head of the entry receiving device is moving downwards in order to de-energize those of the holding coils as are energized in readiness for re-energization by the next card.

Double the multiplicand

The lowest section of the reading-out mechanism provides a reading of twice the multiplicand. In this section the first, third and fifth set of segments 60 are connected through lines 89 and normally closed contacts 2S—1—10 to the lines 71 in such manner that each segment 60 can transmit an impulse at the time corresponding to the units digit of twice the digit of the segment. Each segment in the other two sets is connected to the line 71 for the units digit of the sum of twice the digit of the segment and 1. The units common segment 58 is connected by a line 93 directly, and the left-hand tens and hundreds segments 58 through normally closed contacts 90b and 91b respectively, to lines 93. Thus, the circuits through this reading-out mechanism will normally be timed in accordance with twice the digits entered. With the receiving device representing 673, the units circuit will be timed for 6, i. e., for twice 3. The tens circuit will be timed for the units digit of twice 7, i. e., 4 and one unit must be carried to the hundreds denomination. This carry is taken care of by the shifting of the contacts 91b. With these contacts shifted the hundreds circuit is timed for the units digit of twice six plus one, i. e., for 3. Ten must be carried to the thousands denomination. This carry is taken care of by the shifting of contacts 92b which provide a circuit from the "one" line 71 through the second highest set of contacts 2S1—10, and a line 94, to the thousands line 74 so that one is entered into the thousands denomination of the accumulator LP.

The contacts 90b, 91b and 92b form part of double-wound relays having operating coils 90, 91 and 92, (Figure 3) each connected in parallel with the related magnet MC and in series with cam contacts FC—10. These contacts are timed to close while the holes in the card for 9, 8, 7, 6 and 5 are being read so that one of the coils 90, 91 or 92 will be energized whenever the multiplicand digit is 5 or over. These coils close contacts 90a, 91a and 92a to energize holding coils 90', 91' and 92', the holding circuit including the contacts RC—3.

The contacts 2S—1—10 (Figure 3a) form part of a subtracting relay 2S. When this relay is energized, the connections from the line 71 to the lowest section of the reading-out mechanism are reversed so that the circuits will be completed at times representing the complementary digits of the digits of twice the multiplicand. Thus, the second highest segment 60 in the left-hand set is normally connected to the line 71 for two, but will, when the relay 2S is energized, be connected to the line 71 for 7. The relay 2S also closes contacts 2S—11 in parallel with the contacts —1ZL—5 to provide for the entry of nines into the denominations of the accumulator LP that do not otherwise receive entries, and in order to take care of the entry of the fugitive unit. Thus, with the relays 2S and 2ZL both energized the complement of two times the multiplicand will be entered into the accumulator LP.

It will be noted that two different methods of obtaining the complement are employed. It would be possible to dispense with the relay 2S and to provide a fourth section to the reading-out mechanism connected up in a manner appropriate to giving the complement of twice the multiplicand. The use of the relay 2S avoids the necessity for this additional section.

Method of multiplication

It will be seen that it is possible to enter the multiplicand, twice the multiplicand, the complement of the multiplicand or the complement of twice the multiplicand into the accumulator LP, and to enter five times the multiplicand or ten times the multiplicand into the accumulator RP. Multiplication is effected by making these entries selectively in accordance with the digits of the multiplier. The multiples are selected in accordance with the table in Figure 5. Where two multiples are selected in respect of one multiplier digit they are entered concurrently, one into the accumulator LP and the other into the accumulator RP. The means for selecting the multiples comprises the multiplier receiving device and the relays +1ZL, —1ZL, 2S, 5ZR and 10ZR (Figure 3). It will be observed from the table of Figure 7 that either the multiple is selected which is equal to the product of the multiplicand and a multiplier digit, or a pair of multiples is selected whose sum or difference is equal to the said product. Instead of selecting —2X and 5X and —1X and 5X in respect of the multiplier digits 3 and 4, it will be possible to select 1X and 2X, and 2X and 2X in respect of these multiplier digits. This would, however, necessitate provision for entering twice the multiplicand into the accumulator RP as well as into the accumulator LP, and the table shown avoids this. The manner in which this selection is effected will be apparent from the following description of the operation of the machine as a whole.

Operation of the machine card feed

It should be mentioned first that cam contacts FC—1 etc., are in the card feeding mechanism and operate during card feeding cycles only, while cam contacts CC—2 etc. operate continuously in all cycles.

It will be assumed that a batch of cards has been inserted into the magazine of the machine and that the motor M (Figure 1) is running. A start key is depressed to close contacts 100 (Figure 3b) and complete a circuit through cam contacts FC—1, contacts G—1, the contacts 100 and a relay coil C. This coil closes its contacts C—2 to maintain itself energized through cam contacts FC—2. The coil C also closes contacts C—1 to provide a circuit through contacts P—1, contacts N—1, the contacts C—1, stop key contacts 101, cam contacts FC—3, the card feed clutch magnet CFM and contacts F—1. The contacts P—1 are provided in the punching mechanism for the purpose of preventing a card feeding operation when the punch mechanism is not in its proper position. The magnet CFM engages the clutch 23 (Figure 1) so that the card feeding mechanism commences to operate and feeds the first card into position to pass the brushes 24. When the card reaches this position it closes the contacts 26 to energize a relay coil H. This coil closes its contacts H—1 (top, Figure 3) in order to prepare the card reading circuits.

When the machine is first started, the entry receiving device is in the position shown in Figure 2 and the clutch 34 (Figure 1) is engaged. The cross-head 40 will, therefore, rise to its highest position carrying the slides 50 with it and the clutch 34 will then disengage. It is necessary that the clutch 34 should be engaged halfway through the first card feed cycle, in order that the cross-head and slides may be rising while the card is passing the brushes 24 in the first half of the second card feed cycle. Cam contacts CC—2 close momentarily towards the end of each cycle of the machine, and thus close halfway through the first card feeding cycle to complete a circuit through contacts G—3 which are closed when the machine is first started and the magnet RCM which engages the clutch 34, so that the receiving device may be driven. A relay coil 1CR is also energized, but this has no effect.

The start key is maintained depressed until after the second card feed cycle has been started. Thus, the relay coil C will be energized a second time and will cause the machine to perform a second card feeding cycle. Early in the second card feed cycle, cam contacts FC—5 close while the contacts 26 are still closed, so that a relay coil G will also be energized. This coil closes its contacts G—2 and shifts its contacts G—1, thereby connecting both the coils G and H in series with cam contacts FC—1. The cam contacts FC—1 are timed to close at such times as the card lever contacts 26 open owing to the gaps between the cards. The relays G and H will then be maintained energized until the contacts 26 fail to reclose owing to the exhaustion of cards from the magazine. The shifting of the contacts G—1 also interrupts the circuits through the start key contacts 100 so that the coil C cannot be re-energized, even although the stop key may be held depressed.

This prevents further card feed cycles occurring until after multiplication has been effected in respect of the first card. The coil G also opens its contacts G—3 in series with the receiving device clutch magnet RCM, so that this magnet is not re-energized near the middle of the second card feeding cycle. The receiving mechanism will, therefore, come to rest with the cross-head in its upper position and with the slides 50 set to represent the multiplier and multiplicand read from the cards.

The card reading circuits extend from the A. C.

output of the dynamo through the contacts H—1, cam contacts FC—4, an impulse distributor 102, which serves to prevent sparking of the brushes, a common contact roller 25, and thence in parallel through the brushes 24 to the magnets MP and MC, and also to the relay coils 83, 84, 85, 90, 91 and 92. These circuits occur at times determined by the positions of the holes in the card and result in the multiplicand and multiplier being entered and in the relays 83 to 92 being energized selectively.

Towards the end of this card feeding cycle, the card is delivered to the punch and closes the contacts 27 (Figure 3b) to energize a relay coil F. This coil shifts its contacts F—1 to complete a circuit through cam contacts CC—3, a clutch magnet 103, contacts P—3 and contacts K—1. The contacts K—1 are closed by a coil K, which is energized through contacts P—5 in the punch, which are closed when a card is ejected from the punch and remain closed until the next card is fed through the punch. The magnet 103 couples the punch mechanism to a motor, so that the punch operates to feed the first card of the batch into position to have the product punched in it.

This operation is fully described in the British Specification No. 405,031 and will not be described herein. The coil F also closes contacts F—2, (top, Figure 3), so that, when the cam contacts CC—2 close at the end of the second card feeding cycle, a circuit is completed through contacts K—2 and L—2 and the contacts F—2, to the reset magnet 20LP. As previously explained the energization of this magnet brings about the resetting of the accumulator LP.

*Multiple selecting circuits*

As this accumulator is reset, contacts LP—1, (top left, Figure 3) close to energize relay coils M and N by connecting them between the lines 134 and 135. The coil M closes its contacts M—2 in order to provide a holding circuit for itself and the coil N through the contacts RC—2. The coil N opens its contacts N—1 in series with the card feed clutch magnet CFM (Figure 3b) to prevent further card feeding cycles being initiated until multiplication has been completed. The coil M also closes its contacts M—1 (top right, Figure 3) to connect the multiplier reading-out mechanism in circuit with contacts CC—2.

The coils of the multiple-selecting relays are connected systematically to the segments 60 of the multiplier entry receiving device reading-out mechanism so that the appropriate coil or group of coils is energized in accordance with the multiplier digit entered. Thus, the relay 5ZR is connected to the segments 60 corresponding to 2, 3, 4, 5, 6 and 7 in the first, third and fifth set from the left. The relay 10ZR is connected to the eight and nine segments in the same sets. The relay 1ZL is connected to the segments 60 for one and six in each of the other three sets of segments. The relay —1ZL is connected to the segments for four and nine.

The relay 2ZL is connected to the segments for two and seven, and the relays 2ZL and 2S are connected to the segments for three and eight. The agreement of these connections with the table of Figure 5 will be observed.

It will be assumed that the multiplier is 814 and the brushes 57 are therefore in the position shown in Figure 3. When the cam contacts CC—2 close late in the cycle in which the accumulator LP was reset, they complete a circuit through the contacts M—1, normally closed contacts Yu—3, the right hand units common segment 58, the associated brush 57 and segment 60 for 4 to the relay coil —1ZL. This coil closes its contacts —1ZL—1—4 and 1ZL—5 so as to provide circuits for entering the complement of the multiplicand into the accumulator LP. A parallel circuit extends through contacts Yu—5 and the left hand units common segment 58, brush 57 and segment 60 for 4 and the relay 5ZR. This relay closes its contacts 5ZR—1—4 to prepare circuits for entering five times the multiplicand into the accumulator RP. The circuits through the coils —1ZL and 5ZR continue over a line 104 through normally closed contacts Yu—7 and a relay coil CSu. This coil closes its contacts CSu—1—4 (Figure 3a) and CSu—5—10 (Figure 3b) previously referred to so that the entries are appropriate to multiplication by a units digit. Thus, in the cycle which now occurs, the complement of the multiplicand is entered into the accumulator LP and five times the multiplicand is entered into the accumulator RP.

The contacts of these relays remain closed until the end of the cycle when they are reopened mechanically by the cam 31 (Figure 1) as mentioned previously.

The relay CSu closes its contacts CSu—11 so as to provide a circuit through the contacts RC—2 and M—2, the contacts CSu—11 and a relay coil Yu. This coil closes its contacts Yu—1 to hold itself energized and also opens its contacts Yu—3, Yu—5 and Yu—7, closing its contacts Yu—4, Yu—6 and Yu—8.

Thus, when the contacts CC—2 next close, the circuits are completed through the contacts Yu—4 and contacts Yt—3 to the right hand tens common segment 58 and hence through the associated brush 57, segment 60 for 1, the coil +1ZL, the line 104, the contacts Yu—8, contacts Yt—7 and a relay coil CSt. The coil +1ZL closes its contacts +1ZL—1—3 and the coil CSt closes its contacts CSt—1—4 (Figure 3a) and CSt—5—10 (Figure 3) so as to prepare the circuits for entering the multiplicand into the accumulator LP. No circuit is completed through the contacts Yu—6 and Yt—5 to the left hand tens section of the reading-out mechanism since the "one" segment in this section is not connected in circuit. Thus, no entry is made into the accumulator RP in this cycle.

The relay CSt also closes its contacts CSt—11 to energize a relay coil Yt which closes its contacts Yt—1 to hold itself energized. This coil also shifts the contacts Yt—3, Yt—5 and Yt—8. Thus when the contacts CC—2 again close the circuits will extend through the contacts Yu—4, Yt—4 and Yh—3, the hundreds section of the reading-out mechanism and the coils 2S and 2ZL to the line 104, and also through the contacts Yu—6, Yt—6 and Yh—5, the hundreds section of the reading-out mechanism and the coil 10ZR to line 104. From the line 104 the circuits continue through the contacts Yu—8, Yt—8 and Yh—7 to a coil CSh.

The circuits are now adjusted for the transfer of ten times the multiplicand to the accumulator RP and the complement of twice the multiplicand to the accumulator LP.

The coil CSh closes its contacts CSh—11 to energize a coil Yh, which holds itself energized through its contacts Yh—1 and also shifts its contacts Yh—4 to Yh—7. When the cam contacts CC—2 again close a circuit is completed through the contacts Yu—4, Yt—4 and Yh—4 to the clutch magnet RCM and the relay coil 1CR.

Entry receiving device reset and card feed

The entry receiving device is now driven through a cycle of operations, is cleared and then set up again in accordance with the factors read from the next card. During the first half of the cycle of operations of the entry receiving device, the contacts RC—3 open momentarily to de-energize the holding coils 83' to 92' which are associated with the "two" and "five" times reading-out sections of the multiplicand entry receiving device. The contacts RC—2 are also opened and de-energize the coils Yu, Yt, Yh, M and N, in readiness for the next multiplying operation. The contacts RC—I also close to energize the coil C which holds itself energized through its contacts C—2 and the contacts FC—2, and also closes its contacts C—I to energize the card feed clutch magnet CFM as previously described. A new card feeding cycle is thus initiated.

Transfer RP to LP

The coil ICR closes its contacts ICR—I—6, (lower, Figure 3) so as to connect the reading-out mechanism RPRO provided in the accumulator RP to the accumulator magnets LP. This reading-out mechanism is of conventional construction and serves to connect the emitter EM to the magnets LP in such a manner that the latter are energized at the appropriate times for adding the amount in the accumulator RP.

The amounts added by the two accumulators are shown in Figure 6.

It will be observed that since the highest entry into the accumulator LP is a complement, this accumulator obtains a complement. Thus, the product is obtained as the result of the difference between two numbers. In other cases, however, the product may be the sum of two numbers, both the accumulators obtaining true numbers.

In certain cases the sum of the amounts entered into the accumulator RP may exceed a million, and a case in which this occurs is shown below.

$$975 \times 850 = 828750$$
$$\text{complement of } 975 = 9024$$
$$2 \times 975 = 1950$$
$$\text{complement of } 2 \times 975 = 8049$$
$$5 \times 975 = 4875$$

|  | LP | RP |
|---|---|---|
| 5=+5MC | | 48750 |
| 8=−2MC+10MC | 804999 1 | 975000 |
| Transfer | 805000 023750 | 023750 |
| | 828750 | |

In this case the sum of the amounts entered into the accumulator RP is 1023750, but since the accumulator only has six denominations it is unable to register the unit in the millions denomination. This apparent error has no practical consequence since if the unit were obtained and transferred to the accumulator LP, it would be added to 9 in the millions denomination of the accumulator LP to give zero in that denomination. The addition performed during this transferring is shown below:

$$9805000$$
$$1023750$$
$$\overline{0828750}$$

It will be readily understood that in all the cases in which the sum in the accumulator RP exceeds a million, the sum in the accumulator LP will be complementary and have 9 for its millions digit. The result in the millions place must therefore, always be zero so that it is unnecessary to provide the accumulators with a millions denomination.

Eliminating unwanted cycles

In the example above the units digit of the multiplier is zero. It will be recalled that the multiplier slides 50 cooperate with a special segment in the zero position. The segments are shown in Figure 3 at 60a. If the units multiplier digit is zero, the units slide will connect, by one of its brushes 57, the units segment 60a to the related common segment 58a. Thus, when the contacts M—2 close, a circuit will be completed through the units segment 60a and common segment 58a to the relay coil Yu, which will be energized before the cam contacts CC—2 close so that the first set of multiple-selecting circuits will be completed through the contacts Yu—4 and Yt—3, and the contacts Yu—6 and Yt—5 to the tens part of the multiplier reading-out mechanism instead of to the units part of that mechanism. Thus, the machine will proceed immediately to select multiples in accordance with the tens multiplier digit, omitting the cycle in respect of the units multiplier digit. Cycles are also omitted in a similar manner when the tens digit or hundreds digit is zero.

Accumulator reset and recording the product

As the emitter EM rotates in order to transfer the amount in the accumulator RP to the accumulator LP, it completes a circuit, after the transfer has been completed, through contacts ICR—7 (Figure 3a) to the reset magnet 20RP, so that the accumulator RP is reset in the following cycle.

Early in the card feeding cycle cam contacts FC—8 (Figure 3b) close to energize a relay B which maintains itself energized through contacts B—2 and the contacts LP—2. The relay B also closes its contacts B—I so as to provide a circuit including a line 110 to the reading-out mechanism LPRO of the accumulator LP. This mechanism controls the punch selecting magnets 28 which are selectively energized and cause the punches to perforate the card in accordance with the product contained in the accumulator LP. This punching operation is identical with that described in British Specification No. 405,031 aforesaid, and need not be described herein.

While the product is being punched on one card, the next card is being fed past the brushes 24 and into the punching mechanism. When this card reaches the punching mechanism it closes the contacts 27 to energize the coil F (lower left, Figure 3b). This coil closes the contacts F—2 (top, Figure 3) so that after the contacts K—2 are closed, the reset magnet 20LP will be energized. The contacts K—2 are closed by a relay coil K which is energized as soon as contacts P—5 close. These contacts are closed as soon as the card has been fed to fully pass the punches and is ready for ejection. Thus, the resetting of the accumulator LP will take place as soon as one card has been fully punched with its product and the following card has been read and delivered to the punch.

When the accumulator LP is reset it opens its contacts LP—2 to de-energize the coil B and break the punching circuits and close its contacts LP—3 to energize a coil L. The coil L holds itself energized through contacts L—I and contacts P—2 in the punch. The coil L also opens the contacts L—2 to prevent a second resetting of the accumulator LP. The coil L is de-energized by the opening of the contacts P—2, which are arranged to remain closed until the contacts P—5 open, and then to open.

The resetting of the accumulator LP also results in the contacts LP—I closing to energize the coils M and N, as previously described, so that a new series of multiplying operations take place.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, a pair of entry receiving devices, means for entering a multiplier factor in one device and a multiplicand factor in the other device, a readout mechanism for the multiplier entry receiving device, further readout mechanisms for the multiplicand entry receiving device, result accumulating means, settable source means including said multiplicand readout mechanisms from which the multiplicand, the complement thereof, twice the multiplicand, the complement thereof, five times the multiplicand and ten times the multiplicand may be derived, and means controlled by the multiplier readout mechanism for selectively causing a single value comprising the multiplicand or a multiple thereof corresponding to a multiplier digit, or a pair of values comprising either the multiplicand and a multiple thereof or a pair of multiples, or a pair of values comprising a multiple and a complement of a multiple or the complement of the multiplicand, the sum of which pair of values corresponds to the product of the multiplicand by a multiplier digit, to be derived from said source means and entered into said result accumulating means.

2. In a machine of the class described, a pair of entry receiving devices, means for entering a multiplier factor in one device and a multiplicand factor in the other device, a readout mechanism for the multiplier entry receiving device, further readout mechanisms for the multiplicand entry receiving device from which the one multiple of the multiplicand may be derived, result accumulating means, settable source means including said multiplicand readout mechanisms from which other predetermined complete multiplicand multiples and the complements of certain multiples based upon a received multiplicand may be derived, and means controlled by the multiplier readout mechanism for selectively causing a multiple, a pair of multiples, or a multiple and the complement of a different multiple to be derived from said source means and entered into said result accumulating means, said entry or entries corresponding to a product of the multiplicand by a digit of the multiplier.

3. In a machine of the class described, a pair of entry receiving devices, means for entering a multiplier factor in one device and a multiplicand factor in the other device, a readout mechanism for the multiplier entry receiving device, further readout mechanisms for the multiplicand entry receiving device, result accumulating means, settable source means including said multiplicand readout mechanisms from which predetermined different complete multiplicand multiples and the complements of certain multiples based upon a received multiplicand may be derived, and means controlled by the multiplier readout mechanism for certain digital values of the multiplier for causing one of said multiplicand multiples and one of said complements to be derived from said source means and entered into said result accumulating means, the resulting entry representing the product of the multiplicand by said digital value of the multiplier.

4. In a machine of the class described, a pair of entry receiving devices, means for entering a multiplier factor in one device and a multiplicand factor in the other device, a readout mechanism for the multiplier entry receiving device, further readout mechanisms for the multiplicand entry receiving device, a pair of accumulators, settable source means including said multiplicand readout mechanisms from which the multiplicand, the complement thereof, predetermined complete multiplicand multiples and the complement of a certain multiple may be derived, means controlled by the multiplier readout mechanism, for determining for each multiplier digit what amount or amounts are to be derived from said source means, entering means for each accumulator, and means controlled by said determining means in accordance with each digit of the multiplier factor for connecting the entering means of one of said accumulators to said source means to receive an entry when the product of the multiplicand and the multiplier digit is the multiplicand or a certain multiple thereof, or for connecting the entering means of the other accumulator to said source means to receive an entry when the product of the multiplicand and the multiplier digit is another certain multiple of the multiplicand, or for connecting the entering means of both accumulators to said source means to effect an entry of a multiple in each accumulator concurrently when the product of the multiplicand and the multiplier digit is the sum of said multiples or for connecting the entering means of both accumulators to said source means to effect the entry of a multiple in one accumulator and a complement in the other accumulator concurrently, when the product of the multiplicand and the multiplier digit is the sum of said multiple and said complement, and means for transferring the amount in one accumulator to the other to obtain the final product.

5. In a machine of the class described, a pair of entry receiving devices, means for entering a multiplier factor in one device and a multiplicand factor in the other device, a readout mechanism for the multiplier entry receiving device, further readout mechanisms for the multiplicand entry receiving device, settable source means including said multiplicand readout mechanisms from which predetermined different complete multiplicand multiples and the complements of certain multiples based upon a received multiplicand may be derived, a pair of accumulators, entering means for each, means controlled by the multiplier readout mechanism for certain digital values of the multiplier for causing said accumulator entering means to be concurrently controlled by said source means one in accordance with one of said multiplicand multiples and the other in accordance with one of said complements, the sum of said entries corresponding to a product of the multiplicand by one of said certain digital values of the multiplier, and means for transferring the amount in one accumulator to the other to obtain the complete product of the multiplicand and said certain digital value.

6. In a machine of the class described, a pair of entry receiving devices, means for entering a multiplier factor in one device and a multiplicand factor in the other device, readout mechanism for the multiplier receiving device, readout mechanisms for the multiplicand receiving device, result accumulating means, settable source means including said multiplicand readout mechanisms from which a predetermined complete multiplicand multiple and the complement of a certain multiplicand multiple based upon a received multiplicand may be derived, the sum of said complement and multiple corresponding to the product of the multiplicand by a certain digit of the multiplier and means controlled by the multiplier readout mechanism when said certain digit is entered therein for causing the said complement and said multiple to be derived from said source means and entered into said result accumulating means.

CHARLES CAMPBELL.